United States Patent [19]

Goldberg et al.

[11] Patent Number: 5,201,046

[45] Date of Patent: Apr. 6, 1993

[54] RELATIONAL DATABASE MANAGEMENT SYSTEM AND METHOD FOR STORING, RETRIEVING AND MODIFYING DIRECTED GRAPH DATA STRUCTURES

[75] Inventors: Robert N. Goldberg, Redwood City; Gregory A. Jirak, La Honda, both of Calif.

[73] Assignee: Xidak, Inc., Palo Alto, Calif.

[21] Appl. No.: 542,163

[22] Filed: Jun. 22, 1990

[51] Int. Cl.⁵ .......................................... G06F 15/419
[52] U.S. Cl. ................................ 395/600; 364/DIG. 1; 364/282.1; 364/283.4
[58] Field of Search .................. 364/200, 300; 395/600

[56] References Cited

U.S. PATENT DOCUMENTS

| | | | |
|---|---|---|---|
| 4,468,732 | 8/1984 | Raver | 364/200 |
| 4,829,427 | 5/1989 | Green | 364/300 |
| 4,918,593 | 4/1990 | Huber | 364/200 |

OTHER PUBLICATIONS

McFadden et al; "Data Base Management", 1985, pp. 122-150, The Benjamin/Cummings Publishing Company, Menlo Park, CA.

*Primary Examiner*—David L. Clark
*Assistant Examiner*—Wayne Amsbury
*Attorney, Agent, or Firm*—Flehr, Hohbach, Test, Albritton & Herbert

[57] ABSTRACT

An improved database management system (DBMS) stores, retrieves and manipulates directed graph data structures in a relational database. Each directed graph data structure contains one or more records of data which are interconnected by pointers. Data is stored in the database in the form of two dimensional tables, also known as flat files. The improved DBMS defines a schema for each table in the database. The schema defines the name and data type of each column in a database table. In tables used to store directed graph data structures, at least one column will be defined as having a reference data type. Non-empty entries in that column are pointers to rows in a specified table. Directed graph data structures are stored in specified tables by storing each record of the directed graph in a distinct row of one of the specified tables, with references corresponding to interconnections between records being stored in reference data type columns. Portions of a directed graph are retrieved from the specified table, in accordance with a single specified query and then the query is automatically expanded by also retrieving additional portions of the tables which are referenced by the previously retrieved portions, thereby performing a transitive closure. The retrieved data is stored in a buffer as a list of rows, and then communicated to an application process. An interface program converts the list of rows stored in the buffer into a directed graph data structure.

15 Claims, 6 Drawing Sheets

| | 450 |
|---|---|
| # OF ROWS IN LIST | nTABLES |
| TBUFSIZE: SIZE OF TABLE DEFINITION SECTION | |
| FBUFSIZE: SIZE OF FIXED FORMAT DATA SECTION | |
| VBUFSIZE: SIZE OF VARIABLE FORMAT DATA SECTION | |

452 ← (header section)

454 ←
- 460 — LIST OF TABLENAMES (nTABLES NAMES)
- TABLE DEFINITION #1
  - 462 — LIST OF COLUMN NAMES
  - 464 — LIST OF COLUMN DATA TYPES
  - 466 — LIST OF COLUMN EXPRESSIONS
  - 468 — PRIMARY KEY COLUMNS
- 460 — TABLE DEFINITION #2
  ⋮
- 460 — TABLE DEFINITION #nTABLES

456 ←
- 470 — TABLENUM, FIXED FORMAT PART OF ROW 1
- 470 — TABLENUM, FIXED FORMAT PART OF ROW 2
  ⋮
- 470 — TABLENUM, FIXED FORMAT PART OF LAST ROW

458 ←
- 480 — VARIABLE LENGTH STRING OR DATA
- 480 — VARIABLE LENGTH STRING OR DATA
  ⋮

| ROW OR RECORD IDENTIFIER | POINTER TO TABLE DEF IN DATA BUFFER | POINTER TO ROW IN DATA BUFFER | LINK 494 |
|---|---|---|---|
| | | | |
| | | | ↓ |
| | | | |
| ⋮ | ⋮ | ⋮ | ⋮ |

RELATIONAL DATABASE MANAGEMENT SYSTEM AND METHOD FOR STORING, RETRIEVING AND MODIFYING DIRECTED GRAPH DATA STRUCTURES

The present invention relates generally to computer database systems and particularly to relational database storage methods and systems for storing and retrieving directed graph data structures.

BACKGROUND OF THE INVENTION

A database management system (DBMS) is computer software that stores data and provides software routines for manipulating the stored data. A DBMS may be used directly (i.e., by human users), as a component of another software package, or to provide service to another software package.

A database is a collection of data which is stored and managed as a unit by a DBMS. A "relational database" is a database which contains tables that are used to store sets of data and to specify relationships between the different sets of data stored in the database. Relational databases and database management systems are widely used in the prior art. Therefore this document will describe prior art database systems only to the extent necessary to point out the differences between such prior art systems and the present invention.

Typically, databases are used to store sets of related data. For example, a database may be used to store all the seat reservations made by the customers of an airline, plus information about the airplane (e.g., seating chart information), information about the customers (e.g., address, credit card used to purchase tickets, and travel agent), and so on. This is an example of a database which is well suited for a prior art relational database management system.

The reason that the airline seat reservation database is easy to use with prior art database technology is that the data is easily organized as a set of flat records, in the form of a few tables: one for seat reservations, one for customer information, and so on.

An example of a set of data that is "difficult" to efficiently store and manipulate in a prior art relational database is shown in FIG. 1. This set of data 100, which denotes a set of automobile parts and also denotes which parts are components of other parts, is herein called a "directed graph". The data structures conventionally used to store such sets of data in computers are called "directed graph data structures". The reason that a directed graph is "difficult" to handle with a conventional database system is that while this data can be stored in and retrieved from a conventional database table, it is awkward to do so.

FIG. 2 contains a typical prior art table 110 (herein called the ContainsParts table) that would be used by a prior art database management system to store the directed graph shown in FIG. 1. FIG. 2 also shows a second table 120 (herein called the Parts table) which contains cost data for automobile parts. By using the two tables 110 and 120 together, one can determine the relative costs of manufacturing various portions of an automobile.

While table 110 in FIG. 2 contains all the data needed to reconstruct the directed graph of FIG. 1, it is very awkward for a prior art database management system to utilize data which is organized in this fashion. For example, consider the steps which would need to be performed by the prior art DBMS to generate a directed graph representing the set of all components of the engine. To do this, we would first have to examine all the records with a partName of ENGINE to generate a first list of engine parts. Then we would have to examine all the records for the parts identified in this first search (i.e., with partName equal to CAM SHAFT or WATER JACKET OR CYLINDER 1, etc.). In a real life example, we would then have to examine all the records for the parts identified in the second search, and so on.

In terms of search commands using SQL, the industry standard language for querying databases, a separate query would be required for retrieving each set of subparts. As will be explained in more detail below, to regenerate the portion of the directed graph corresponding to ENGINE, one would have to perform literally dozens of queries. TABLE 1 lists the fifty-four SQL queries which would be required to regenerate the entire directed graph for AUTOMOBILE:

TABLE 1

| PRIOR ART QUERIES FOR RETRIEVING DIRECTED GRAPH |
|---|
| 1) SELECT * FROM ContainsParts WHERE PARTNAME = "AUTOMOBILE" |
| 2) SELECT * FROM ContainsParts WHERE PARTNAME = "BODY" |
| 3) SELECT * FROM ContainsParts WHERE PARTNAME = "FRAME" |
| 4) SELECT * FROM ContainsParts WHERE PARTNAME = "POWER TRAIN" |
| 5) SELECT * FROM ContainsParts WHERE PARTNAME = "DASH BOARD" |
| 6) SELECT * FROM ContainsParts WHERE PARTNAME = "SEATS" |
| 7) SELECT * FROM ContainsParts WHERE PARTNAME = "SHELL" |
| 8) SELECT * FROM ContainsParts WHERE PARTNAME = "WINDSHIELD" |
| 9) SELECT * FROM ContainsParts WHERE PARTNAME = "DIFFERENTIAL" |
| 10) SELECT * FROM ContainsParts WHERE PARTNAME = "DRIVE SHAFT" |
| 11) SELECT * FROM ContainsParts WHERE PARTNAME = "ENGINE" |
| 12) SELECT * FROM ContainsParts WHERE PARTNAME = "TRANSMISSION" |
| 13) SELECT * FROM ContainsParts WHERE PARTNAME = "CAM SHAFT" |
| 14) SELECT * FROM ContainsParts WHERE PARTNAME = "CYLINDER 1" |
| 15) SELECT * FROM ContainsParts WHERE PARTNAME = "CYLINDER 2" |
| 16) SELECT * FROM ContainsParts WHERE PARTNAME = "CYLINDER 3" |
| 17) SELECT * FROM ContainsParts WHERE PARTNAME = "CYLINDER 4" |
| 18) SELECT * FROM ContainsParts WHERE PARTNAME = "CYLINDER 5" |
| 19) SELECT * FROM ContainsParts WHERE PARTNAME = "CYLINDER 6" |
| 20) SELECT * FROM ContainsParts WHERE PARTNAME = "CYLINDER 7" |
| 21) SELECT * FROM ContainsParts WHERE PARTNAME = "CYLINDER 8" |
| 22) SELECT * FROM ContainsParts WHERE PARTNAME = "WATER JACKET" |
| 23) SELECT * FROM ContainsParts WHERE PARTNAME = "PISTON 1" |
| 24) SELECT * FROM ContainsParts WHERE PARTNAME = "PISTON 2" |
| 25) SELECT * FROM ContainsParts WHERE PARTNAME = "PISTON 3" |
| 26) SELECT * FROM ContainsParts WHERE PARTNAME = "PISTON 4" |

TABLE 1-continued
PRIOR ART QUERIES FOR RETRIEVING DIRECTED GRAPH

```
27) SELECT * FROM ContainsParts WHERE PARTNAME = "PISTON 5"
28) SELECT * FROM ContainsParts WHERE PARTNAME = "PISTON 6"
29) SELECT * FROM ContainsParts WHERE PARTNAME = "PISTON 7"
30) SELECT * FROM ContainsParts WHERE PARTNAME = "PISTON 8"
31) SELECT * FROM ContainsParts WHERE PARTNAME = "SPARK PLUG 1"
32) SELECT * FROM ContainsParts WHERE PARTNAME = "SPARK PLUG 2"
33) SELECT * FROM ContainsParts WHERE PARTNAME = "SPARK PLUG 3"
34) SELECT * FROM ContainsParts WHERE PARTNAME = "SPARK PLUG 4"
35) SELECT * FROM ContainsParts WHERE PARTNAME = "SPARK PLUG 5"
36) SELECT * FROM ContainsParts WHERE PARTNAME = "SPARK PLUG 6"
37) SELECT * FROM ContainsParts WHERE PARTNAME = "SPARK PLUG 7"
38) SELECT * FROM ContainsParts WHERE PARTNAME = "SPARK PLUG 8"
39) SELECT * FROM ContainsParts WHERE PARTNAME = "EXHAUST VALVE 1"
40) SELECT * FROM ContainsParts WHERE PARTNAME = "EXHAUST VALVE 2"
41) SELECT * FROM ContainsParts WHERE PARTNAME = "EXHAUST VALVE 3"
42) SELECT * FROM ContainsParts WHERE PARTNAME = "EXHAUST VALVE 4"
43) SELECT * FROM ContainsParts WHERE PARTNAME = "EXHAUST VALVE 5"
44) SELECT * FROM ContainsParts WHERE PARTNAME = "EXHAUST VALVE 6"
45) SELECT * FROM ContainsParts WHERE PARTNAME = "EXHAUST VALVE 7"
46) SELECT * FROM ContainsParts WHERE PARTNAME = "EXHAUST VALVE 1"
47) SELECT * FROM ContainsParts WHERE PARTNAME = "INTAKE VALVE 1"
48) SELECT * FROM ContainsParts WHERE PARTNAME = "INTAKE VALVE 2"
49) SELECT * FROM ContainsParts WHERE PARTNAME = "INTAKE VALVE 3"
50) SELECT * FROM ContainsParts WHERE PARTNAME = "INTAKE VALVE 4"
51) SELECT * FROM ContainsParts WHERE PARTNAME = "INTAKE VALVE 5"
52) SELECT * FROM ContainsParts WHERE PARTNAME = "INTAKE VALVE 6"
53) SELECT * FROM ContainsParts WHERE PARTNAME = "INTAKE VALVE 7"
54) SELECT * FROM ContainsParts WHERE PARTNAME = "INTAKE VALVE 8"
```

By way of comparison, the present invention allows a person or program to retrieve an entire subtree (or even a pruned subtree) of a directed graph using a single query. The single query needed to retrieve the entire directed graph in the preferred embodiment of the present invention is:

```
SELECT * FROM ContainsParts
    EXPAND ContainsParts(*)
    WHERE PARTNAME = "AUTOMOBILE"
```

The single query which would retrieve all portions of the directed graph corresponding to ENGINE is:

```
SELECT * FROM ContainsParts
    EXPAND ContainsParts(*)
    WHERE PARTNAME = "ENGINE"
```

Trees and other directed graph data structures are commonly used in scientific and engineering applications to represent and store data. Because of the limitations in the prior art, these types of scientific and engineering data are typically not stored using database management systems. As a result, all of the well developed tools associated with database management systems are generally not available to the users of scientific and engineering data. Instead, such data is typically stored and manipulated using a wide variety of special software programs. These programs vary widely in their manner of operation, how they represent data internally, and so on. Unlike relational database management systems, the programs each have a different theory of operation and each tends to be used by only a small market niche.

The primary goal of the present invention is to enable scientific and engineering data, which is normally stored in the form of tree data structures or directed graph data structures in operating system files (i.e., files directly accessed by application programs), to be easily stored and manipulated in a relational database management system. From another perspective, the primary goal of the present invention is to modify conventional relational database management systems so as to efficiently and intelligently handle data which is logically organized as a directed graph.

An important property of the present invention that is not provided by prior art relational database management systems is "transitive closure". Transitive closure means the ability to follow the links in a directed graph data structure and to process an entire or specified portion of a tree or directed graph as single entity. Database management systems which include the features of the present invention perform transitive closures, whereas prior art relational database management systems do not.

SUMMARY OF THE INVENTION

In summary, the present invention is an improved database management system (DBMS) which can store, retrieve and manipulate directed graph data structures in a relational database. Each directed graph data structure comprises one or more records of data which are interconnected by pointers. Data is stored in the database in the form of two dimensional tables, also known as flat files or base tables.

The improved DBMS defines a schema for each base table in the database. The schema defines the name and data type of each column in a database table. For tables used to store directed graph data structures, at least one column of the table will be defined as having a reference data type, which means that non-empty entries in that column contain "references" to other rows in the same or other tables in the database. A "reference" is a datum (stored in a reference column of a table) which matches the primary key of a particular row in a specified table in the database.

Directed graph data structures are stored in specified database tables by storing each record of the directed graph in a distinct row of a specified table. Interconnections between the directed graph's records are represented or denoted by references stored in reference columns, i.e., columns denoted in the table's schema as being a reference data type column. Portions of a directed graph are retrieved from base tables, in response to a query, by retrieving a portion of a first specified base table in accordance with the specified query and then expanding the retrieved data by also retrieving additional portions of base tables which are referenced by the portions of the first specified table already retrieved in accordance with the query.

In the preferred embodiment, the portions of a table retrieved in response to a query are stored in a buffer and then transmitted or communicated to an application process (i.e., to whomever sent the query to the DBMS). If the retrieved rows from the database include non-empty reference values, those reference values are automatically converted by the DBMS into pointers which point to other retrieved rows that are stored in the buffer. The application process includes an interface program for converting the retrieved portions of the specified table into a directed graph data structure.

Updates or modifications of directed graph data structures are handled in much the same way as storing a directed graph in the first place. The modified portions of the directed graph are converted into a set of rows in accordance with the specified schema for the target table or tables (i.e., the table(s) in which the directed graph is to be stored). Each resulting row of data is then used to modify or update corresponding portions of the target table(s).

BRIEF DESCRIPTION OF THE DRAWINGS

Additional objects and features of the invention will be more readily apparent from the following detailed description and appended claims when taken in conjunction with the drawings, in which:

FIG. 7 depicts the data structure for a list of rows retrieved from a database using an expanded query.

FIG. 8 depicts a hash table used during data retrieval and storage.

DESCRIPTION OF THE PREFERRED EMBODIMENT

Figure 3:
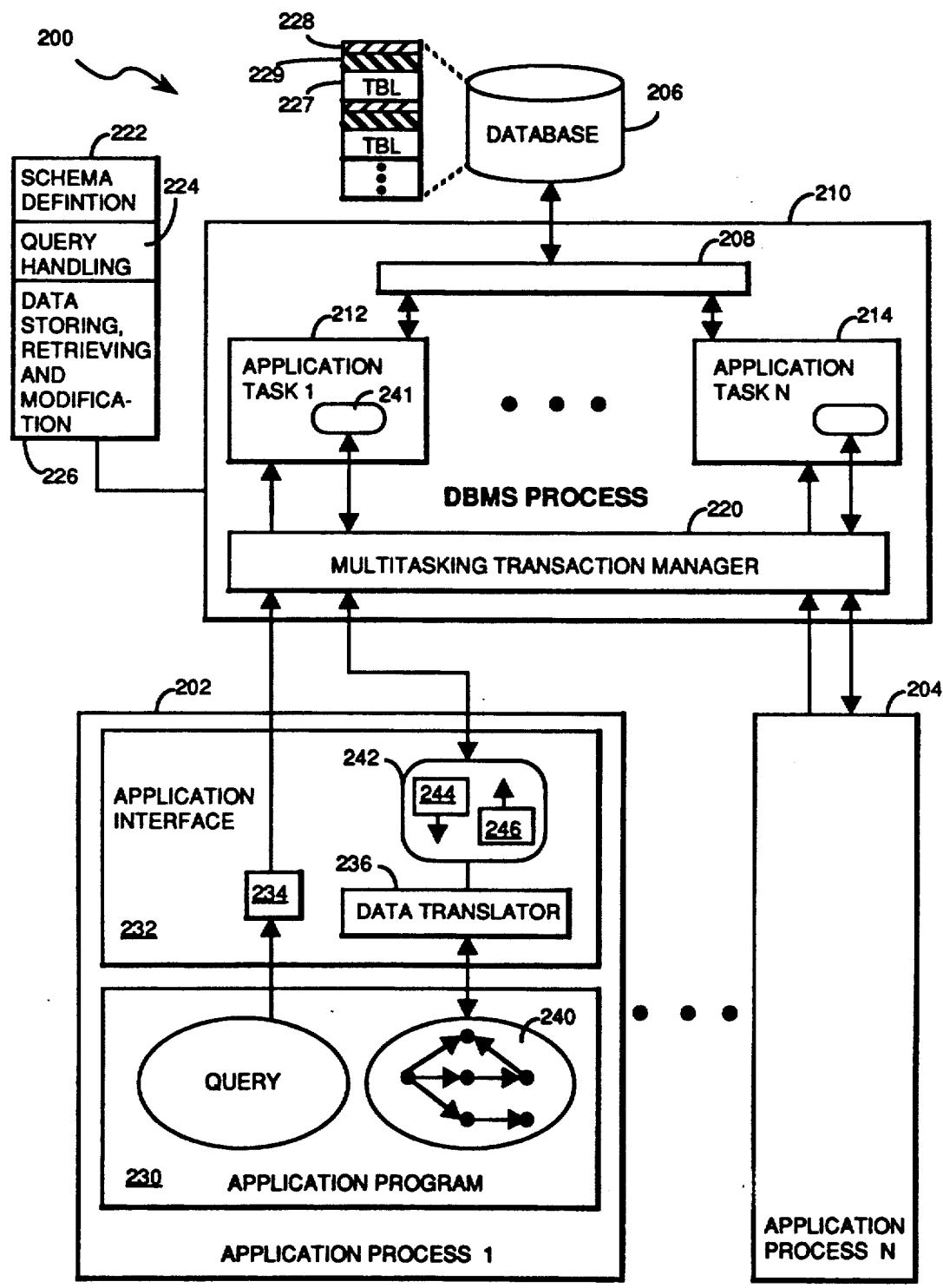
FIG. 3 is a block diagram of a database management system in accordance with the present invention.

Referring to FIG. 3, there is shown a multiuser database management system (DBMS) 200, drawn so as to emphasize the portions of the DBMS which are particularly relevant to the present invention. Before discussing this Figure in detail, the following glossary of terms is provided.

GLOSSARY

APPLICATION—A computer program that solves some particular problem. Applications may use a DBMS to store and manipulate information relevant to such application.

APPLICATION PROGRAMMER—The person or persons who write the source code for an application, such as a computer aided design program. Application programmers of ordinary skill in the art possess the skills necessary to implement applications within a specified application domain, and are also skilled in the use of prior art RDBMS products such as IBM's DB2, Oracle's Oracle, and Ingres (a trademark of Ingres Inc.). Application programmers of ordinary skill in the art are also skilled users of programming languages, such as C, the MAINSAIL programming language, and ADA, and can construct programming language interfaces which enable an application to send queries to a prior art relational DBMS system and to receive data and other responses generated by the prior art DBMS.

BASE TABLE—A table that corresponds to data physically stored in a permanent storage medium, as distinct from a derived table that is defined by a query used to retrieve data from a base table.

C—A programming language, often used to write engineering application programs. See for example, B. Kernighan and D. Ritchie, "The C Programming Language", 2nd Edition, Prentice Hall, New Jersey, 1988.

CYCLE—In the context of structured data such as directed graph data structures, a cycle is a closed loop consisting of a series of references from one component back to itself. For example, if the interstate highway system were represented in a database, where each highway was a row that contains references to each other row (highway) for which there is an exit, there would be many cycles, because it is possible to start on one highway, exit to another, and eventually exit back onto the original highway.

DATA ITEM—An instance of a particular data type. For example, the number 1 is an instance of the data type INTEGER.

DATA TYPE—A name for a set of possible values that may be represented in a computer's memory, along with a set of operations on those values. For example, the data type INTEGER allows for the representation of positive counting numbers (1,2,3,...), negative numbers (−1,−2,−3,...), and zero (0), and provides for arithmetic operations such as addition and multiplication. Each DBMS product supports a predefined set of data types.

DATABASE—A collection of related information, or data. Many databases are abstract representation of information pertinent to an enterprise, such as the design of integrated circuits.

DATABASE MANAGEMENT SYSTEM (DBMS)—A component of a computer system that provides support for the storage and management of databases.

DERIVED TABLE—A table that is defined by the results of a query that retrieves data.

DIRECTED GRAPH DATA STRUCTURE—A data structure that models arbitrary relationships among data objects. Directed graph data structures include, for example, trees, linked lists, and cyclical graph structures (structures with cycles). Directed graph data structures are defined and discussed in Aho, Data Structures and Algorithms, Addison-Wesley, 1983 (pp. 198-199).

ENGINEERING APPLICATIONS—Applications, such as computer-aided design (CAD), computer-aided manufacturing (CAM), and computer-aided software engineering (CASE), that must retrieve, manipulate, and store structured data that model objects of much greater complexity than typically found in business applications.

FOREIGN KEY—A foreign key in a table T1 is a list of one or more columns in table T1 that correspond to the primary key columns of a base table T2. (Table T1 and T2 may or may not be distinct.) Thus, the foreign key column values in a particular row of T1 logically refer to the row of T2 whose primary key column values matches such foreign key column values.

LIST—An ordered collection of zero or more data items, possibly containing some duplicate values.

NULL—A missing or unspecified value.

PRIMARY KEY—Associated with each base table in a relational database is an ordered list of columns whose values uniquely identify a particular row of the table. This list of columns comprises the primary key of the table. More particularly, the primary key of an individual row of the table consists of the values of the primary key columns for that row. Specification of the primary key values for a given row is the only way to identify that particular row.

PROGRAM—See application.

QUERY—An instruction (command) to a DBMS that tells the DBMS to perform a desired action. Typical actions include the retrieval of data from the database and making changes to the data stored in the database.

QUERY LANGUAGE—A computer language for expressing data retrieval questions and modification operations on a database. The query language defines the set of commands that are accepted by the DBMS, including the syntax and the actions or meaning associated with the syntax. A query is thus a particular instruction or sentence in the query language.

RECORD—A record is a memory resident aggregate data type supported by many programming environments. Each such programming environment provides a way to declare a description for each type of record used by an application (including the names and types of the constituent data types making up the record), a way to allocate new instances of each record type, and, often, a way to dispose of (recycle) records when no longer needed by the application.

REFERENCE—REFERENCE is a database column data type which is an extension of the concept of foreign key. Column that are declared in the schema to be of type REFERENCE are used to refer to individual rows by matching foreign key values to primary key values. The REFERENCE data type is used in the database representation of directed graph data structures. In a table having a reference column, each nonempty reference in the table matches the primary key value of a row in a specified table in the database. References differ from foreign keys in several ways that are explain in detail below. Most importantly, a reference is essentially a set of bits which match the primary key of a row in a base table. Each reference value is stored in a single reference column, even if the corresponding primary key occupies two or more columns of the referenced table.

RELATION—A data table of values, such data table being an open-ended and unordered collection of rows, each row consisting of an ordered and fixed list of data items.

RELATIONAL DBMS (RDBMS)—A DBMS that allows an application to define and operate on a database using the abstractions of the standard relational model, which frees the application from physical database storage considerations. In particular, data are represented using relations (tables).

RETRIEVAL QUERY—Any query that specifies that data be retrieved (passed from the DBMS to an application).

ROW—The list of related column values in a table corresponding to a particular primary key value.

SCHEMA—A description of the information that is represented by a database. More particularly for relational databases, a description of the tables that make up the database, including the table names, the column names and column types of each table, and any other information that is needed to enable an application, a DBMS, or a user to interpret the contents of the database.

SET—An unordered collection of zero or more unique data items, none of which can be null.

STRUCTURED DATA—Data that model the complex structure of real-world objects and events, including (in general) multiple links from one component of the structure to another and cycles. Structured data may conveniently be represented using a directed graph data structure.

STRUCTURED QUERY LANGUAGE (SQL)—The industry-standard query language for relational DBMS, as defined by the American National Standards Institute's standard ANSI X3.135-1986. An extension of this standard to include more powerful constructs, called SQL2, is currently being carried out in the working joint standards committee ANSI X3H2 and the International Organization for Standardization ISO DBL SYD-2. NOTE: The use of the word "structured" in the context of SQL is completely unrelated to the use of the same word in "structured data".

TABLE—Each table is described by the database schema and consists of a set of "rows", each of which contains values for each column of the table.

TOP-LEVEL RECORD—The starting point of a directed graph data structure as represented in an application's memory.

TOP-LEVEL ROW—The starting point of a directed graph data structure as represented in an extended relational database.

DATABASE MANAGEMENT SYSTEM

The database management system (DBMS) 200 shown in FIG. 3 is coupled to a number of application processes 202-204, hereinafter called applications. The DBMS 200 stores, retrieves and updates information in a database 206 on behalf of the applications. One of the primary benefits of using a DBMS 200 is that it relieves applications programmers from having to deal with data storage and retrieval, and instead allows application programmers to concentrate on solving the problems for which a specified application program is being developed. Another benefit of using a DBMS 200 is that it provides a mechanism which allows multiple applications to share the information in a shared database 206.

Physically, the data in the database is typically stored partially in high-speed random access memory (RAM) and partially on disk drives. A storage management subsystem 208 manages physical storage of the database 206, and typically includes performance enhancement features such as software for disk caching and for indexing on column values. A "b-tree" or "b+tree" physical storage technique is often used by commercial DBMS. Since storage management is not related to the present invention, and is well understood by those skilled in the art, it is not discussed any further herein.

In the preferred embodiment, each application process 202, 204 will reside on a separate computer, each of which is coupled to a host computer or network server which runs the database management system process 210. The DBMS process 210 includes a separate application task 212–214 for each application that is currently using the database. To coordinate communications with multiple applications and to allow a single computer to run multiple application tasks, the DBMS process 210 includes a multitasking transaction manager 220. In other words, the computer on which the DBMS is running includes multitasking operating system software for handling multiple tasks or execution threads.

As will be understood by those skilled in the art, there are many possible system configurations, all of which are equivalent for the purposes of the present invention. For example, in other embodiments it would possible for both the DBMS and the application programs to all be running on a single computer, or for the DBMS and some of the application programs to be running on one host computer (e.g., a mainframe or high performance minicomputer) with other application programs running in separate computers that are coupled to the host computer by a communications network.

The commands sent by application processes to the DBMS 200 are typically called queries. Furthermore, many commercial database systems use an industry standard query language, called SQL (Structured Query Language), which defines the syntax and interpretation of the queries which can be used by applications to store, retrieve and manipulate data in a database system. For the purposes of this description, it is assumed that queries sent by applications to the DBMS 200 in the preferred embodiment of the present invention conform to SQL, with a few exceptions that are described in detail below.

Each application task 212–214 in the DBMS process 210 uses a shared set of software for handling queries from applications. The three primary software modules or sets of software which are modified by the present invention are the software 222 for defining database tables and their associated schemas, the software 224 for interpreting queries sent by application programs, and the software 226 for handling data storage, retrieval and modification.

Figure 2:
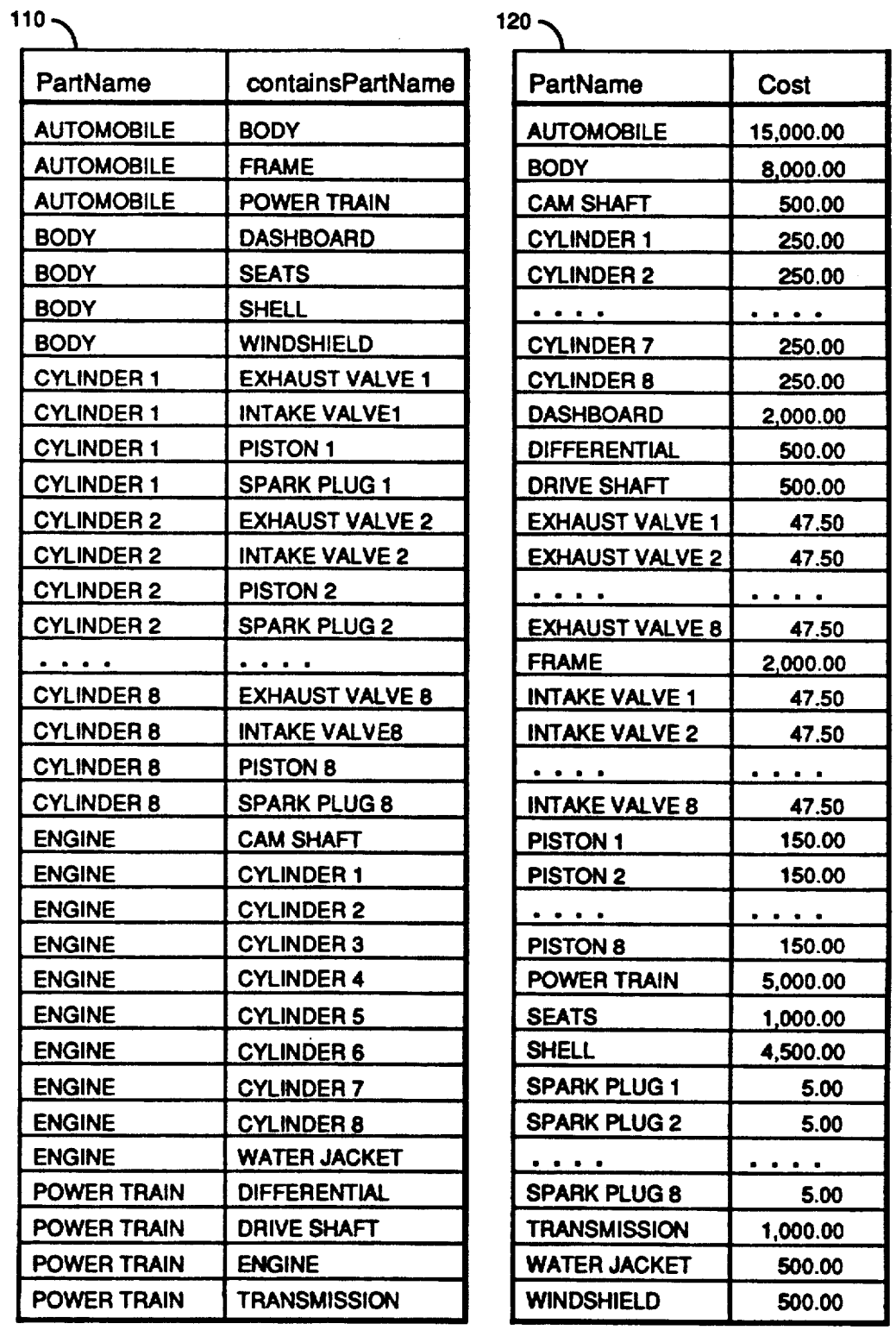
FIG. 2 depicts two tables for storing data corresponding to the directed graph shown in FIG. 1.

The data stored in the database 206 is organized as a set of base tables. Each base table 227 consists of an array of data organized in columns and rows. For each base table 227 there is a corresponding schema 228, which defines the data type associated which each column in the table 227. For instance, the first column of the table 110 (shown in FIG. 2) has a data type of "character string" and the second column also has a data type of "character string". The second column of table 120 shown in FIG. 2 has a data type of "decimal". Base tables and schemas will be described in more detail below.

As is standard in prior art DBMS's, each base table 227 also has one or more indices 229 which are specialized data structures for quickly locating any specified row in a base table. As will be discussed below, every base table 227 has a primary key and an index for that primary key.

APPLICATION INTERFACE.

In the preferred embodiment, each application process 202–204 includes an application program 230 and an application interface 232, as shown in FIG. 3. The purpose of the application interface 232 is firstly to communicate queries from the application program to the DBMS process 210 (see software module 234) and secondly to communicate or transmit data in both directions between the application program 230 and the DBMS process 210. In the context of the present invention, the software 236 for transmitting data between the application program 230 and the DBMS process 210 is called a data translator or converter because it converts directed graph data structures 240 from the application program 230 into a form suitable for transmittal to the DBMS process 210, and also converts data retrieved from the database 206 into directed graph data structures for use by the application program 230.

More specifically, data retrieved from the database 206 in response to a query from application 202 is transmitted to the application process 202 in the form of a list 244 of one or more rows of retrieved data. The list 244 contains portions of one or more of the base tables stored in the database 206. In other words, each row in the list 244 comprises a selected row, or a portion of a selected row from a base table. Furthermore, each row in the list 244 may come from a distinct base table.

The list of rows 244 retrieved from the database 206 is temporarily stored in a buffer 241 in the application task 212 of the DBMS process, and then the contents of that buffer are transmitted to buffer 242 in the application interface 232. The data translator software 236 converts the retrieved data stored in the buffer 242 into a directed graph data structure for use by the application program 230. In other words, each row of the list 244 in the buffer is converted into a record with a data structure compatible with the application program 230.

When directed graph data structures 240 are sent by the application program 230 to the DBMS process 210 for storage in the database 206, the data translator 236 in the application interface 232 converts that data into a list of rows 246, and stores that list in buffer 242. Each row in the list 246 has an associated row number. The pointers in each record (i.e., pointer fields which point to other records) that is stored as a row in list 246 are converted into row numbers. Furthermore, each row or record in list 246 has a set of columns that are a subset of the columns of a base table that is stored in the database 206. After the records of the directed graph have been converted into a list of records stored in buffer 242, the contents of the buffer 242 are transmitted to the DBMS process 210 for storage in one or more target base tables. In the most common case, all the columns in each record of the list 246 match the data types of columns in a target base table, the records in the list 246 can be directly copied into the target base table.

The data structure for storing the retrieved list of rows 244 and the list of records to be stored 246 is described below with reference to FIG. 7.

DIRECTED GRAPH DATA STRUCTURE

The present invention is particularly suited for use in conjunction with engineering application programs, such as computer-aided design (CAD) programs, computer-aided manufacturing (CAM), and computer-aided software engineering (CASE), and other programs which must store, retrieve, and manipulate structured data that model objects of much greater complexity than typically found in business applications.

Figure 1:
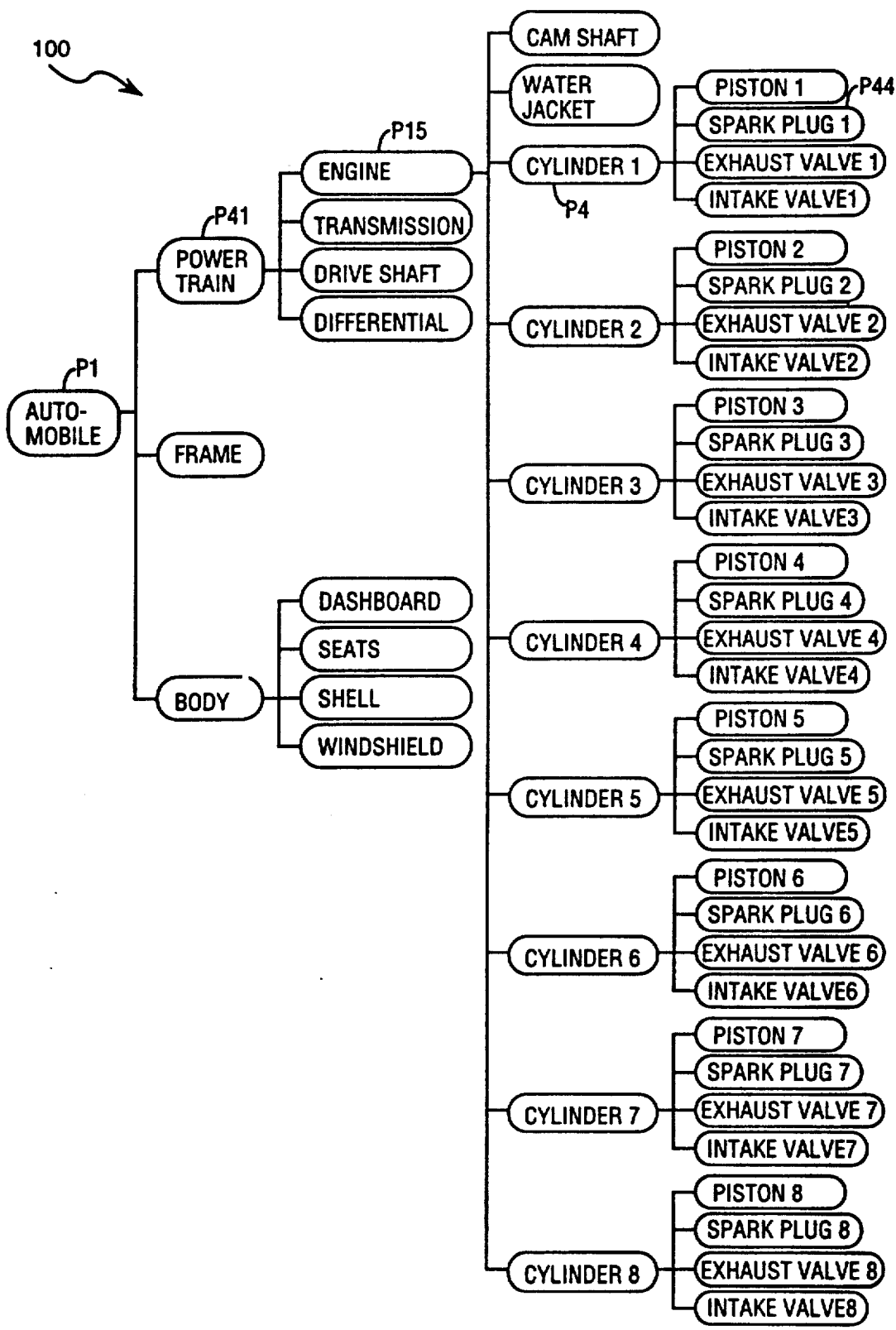
FIG. 1 depicts an example of a directed graph.
Figure 4:
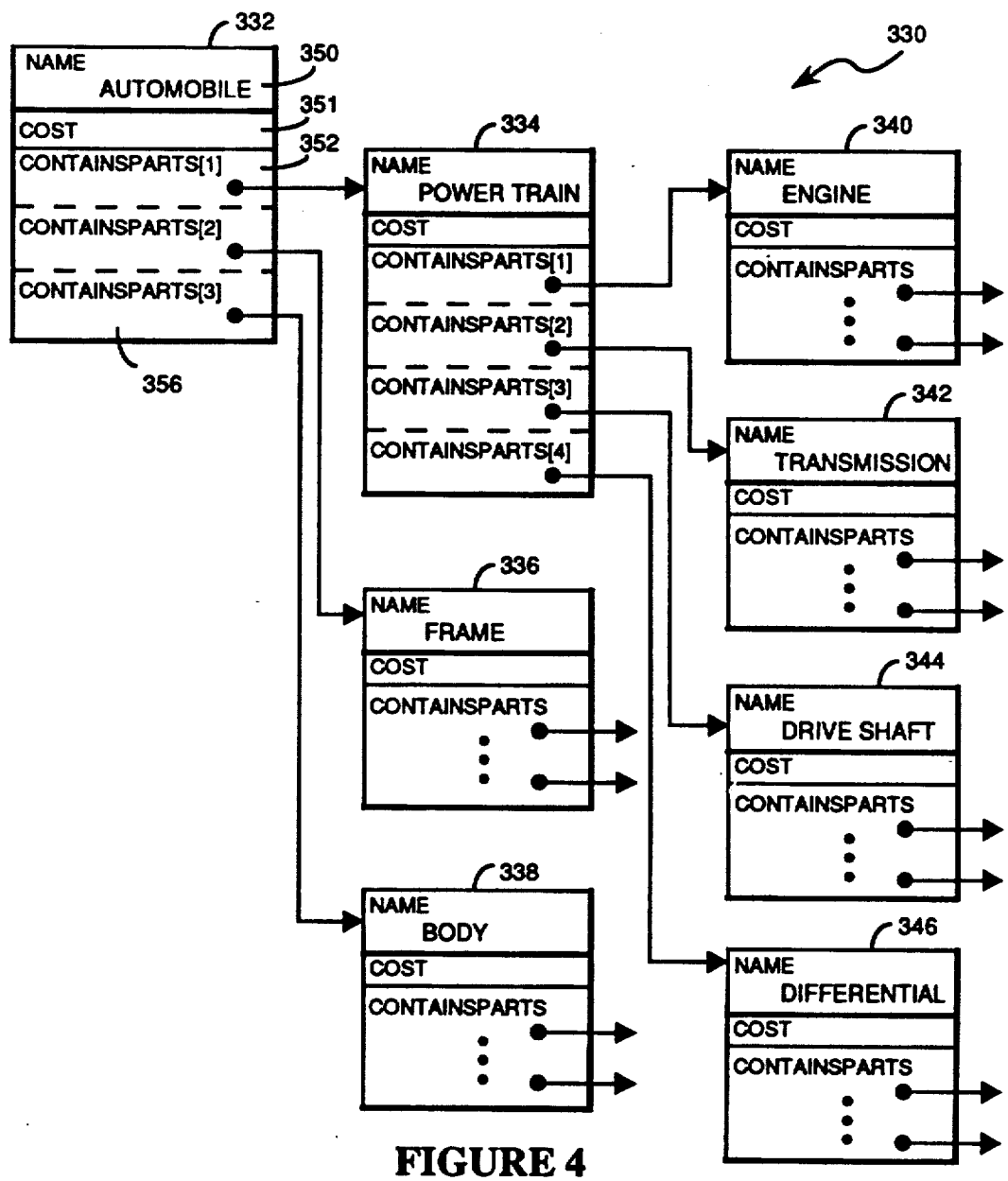
FIG. 4 illustrates a directed graph data structure.

Referring to FIG. 4, there is shown a directed graph data structure 330, similar to FIG. 1, but explicitly showing the pointers between records in the data structure in one particular programming environment. Each record 332-346 of the directed graph data structure 330 in this example includes a name field 350, followed a decimal number field 351 for storing cost data, followed by a set 352 of pointers herein labelled CONTAINSPARTS[1], CONTAINSPARTS[2], and so on. For example, the top-level record 332 of the data structure 330 has a name field with a value of AUTOMOBILE, and is coupled to records 334, 336 and 338 by a set of three pointers. Record 334 is coupled, in turn, by four pointers to records 340, 342, 344 and 346. Record 340, labelled ENGINE, is coupled by pointers to ten other records, not shown in this Figure.

SCHEMA AND TABLE FOR STORING DIRECTED GRAPHS.

The primary change to the software 222 for defining tables and their associated schemas is simply to add one additional data type to the set of allowed data types which can be specified for the columns of a table. In particular, the present invention adds a new data type herein called the "Reference" data type, for columns of a table which contain references to other rows in either the same base table or another base table.

Figure 5:
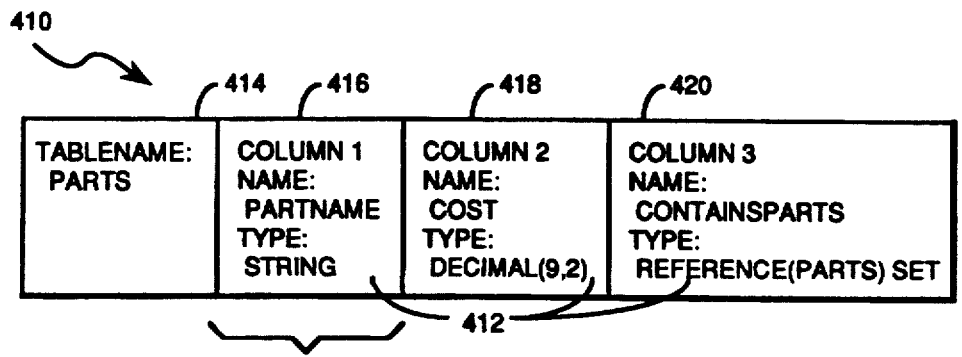
FIG. 5 depicts the schema for a database table used to stored directed graph data structures.
Figure 6:
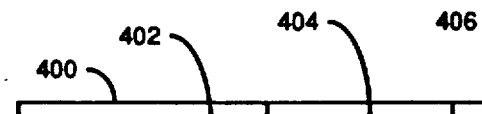
FIG. 6 depicts an example of a database table used to stored directed graph data structures.

Referring to FIGS. 5 and 6, there is shown a base table 400, herein called the "parts" table, which is suitable for storing the directed graph data structure shown in FIG. 4, and the schema 410 for that base table. In this particular example, the base table 400 shown in FIG. 6 has three columns: a "partname" column 402, a costs data column 404, and a "containsparts" column 406 containing a set (see definition of a "set" in the Glossary, above) of references. The base table 400 has a multiplicity of rows 420, each of which contains a related collection of data (in this example, the data in each row concerns one "part" of an automobile).

The schema 410 for a table denotes the name of the table, and then contains a distinct entry 412 for each column of the table 400, each entry defining the name and data type of one column in the corresponding base table 400. The first item 414 in the schema 410 in FIG. 5 is the table's name, which is "Parts". The next item 416 in the schema defines the first column 402 of the table 410, including the name of the column, "PartName", and its data type, which is "character string". Next, the schema contains a definition 418 of the second column of the table 404, which stores cost data. As shown by the schema item for this column, the column has a name of "Cost" and has a data type of "decimal(9,2)", which indicates the cost data contains nine digits, two of which are to the right of a decimal point. The last entry 420 in this schema 410 indicates that column 406 is a SET (which is an array containing an unordered collection of non-empty unique values) having the name "CONTAINSPARTS", with a data type of "Reference (Parts)", which means that each value stored in the CONTAINSPARTS SET is a reference to a row in the Parts table 404. Reference data type columns will be described in more detail below.

To define a new base table in a database, the DBMS provides a CREATE command which defines the name of the table, the name and data type of each column in the table, and also the primary key associated with the table. For example, the CREATE command for creating the table in FIG. 6 would be:

---
CREATE TABLE Parts (

---
-continued
---
STRING partName;
DECIMAL(9,2) cost;
REFERENCE (Parts) SET containsParts;
PRIMARY KEY partName )
---

Execution of this command would generate the schema 410 shown in FIG. 5 and an empty table 400 having the format of the table shown in FIG. 6. While the primary key in this example is based on a single column of the table, in many applications, the primary key will be an ordered list of columns whose values uniquely identify a particular row of the table.

As is standard in prior art DBMS's, tables and their schema can be modified after their initial definition. Thus extra columns can be added to a pre-existing base table and columns can be deleted. For example, it is possible to add columns with a Reference data type to a pre-existing base table which does not contain any Reference columns.

The preferred embodiment of the present invention also adds three additional data types not found in prior art relational database management systems: ARRAY, LIST and SET. In particular, any column of a base table can be defined to have a data type of ARRAY, LIST or SET, as well as the other standard data types, such as INTEGER, STRING, DECIMAL(x,y) and so on. An ARRAY is simply a conventional array, such as the arrays used in FORTRAN and other computer languages. What is unusual about the ARRAY data type in the context of the present invention is that a column of a base table can be defined as an array, and thus each row in the base table will store an array of data in that particular column. A LIST is an ordered collection of data, which may contain data that is null or non-unique. A SET is a unordered collection of non-empty unique data values. Prior art relational database management systems could only store one data value in each column position of a row. These three new data types make it much easier to store the type of data encountered in engineering and scientific type applications.

REFERENCE COLUMNS AND POINTERS

The data stored in a column with a data type of Reference are indirect pointers or "references" to rows in a specified base table. As shown in FIG. 5 above, the specification for a reference column in a table's schema specifies not only the data type "Reference" but also the name of the base table for which the column contains references. Thus, all the references in one reference column of a table may reference rows in "Table A" while the references in another reference column will reference rows in "Table B". Table A or B may, or may not, be the same table as the one containing the references.

More generally, references are similar to "foreign keys". A foreign key, as used in prior art DBMS's, is an ordered set of column values stored in a first table which matches the primary key value of a row in another table. Each non-empty value stored in a single reference data column, on the other hand, matches the primary key value of a row either in the same table as the table containing the reference data column, or in another base table, regardless of the number of columns required to define that primary key. In other words a reference value stored in a single column will match the binary bit pattern of a multiple column primary key. The values stored in Reference columns are sometimes herein called "pointers" because primary key values are, logically, pointers to rows in a table. In terms of DBMS programming techniques, each primary key is converted during the course of transaction processing into a pointer to a particular address in a computer's memory through the use of an index. Thus each non-empty reference value points, directly or indirectly, to a particular row in a specified table.

STORING A DIRECTED GRAPH IN A BASE TABLE

The first step in storing a directed graph data structure in a database is for the application program 230 to transmit the directed graph data structure to the application interface 232. Note that when a directed graph is being sent by an application for storage in a database, there must already be one or more base tables 227 in the database 206 which have suitable sets of columns for storing this directed graph. Note that a directed graph may contain a number of different types of records, each of which stores different types of data. Typically, each type of record in the directed graph will be stored in a different base table, although other arrangements are possible.

If the base tables needed to store the directed graph do not yet exist, the application program 230 must first send instructions (i.e., a CREATE TABLE command) to the DBMS 210 so as to define the needed base tables. These base tables are called the "target" base tables in the database.

Intermediate Data Format for Buffered Data

Referring to FIG. 7, data is transported in both directions between the application program and the database management system using a "portable data representation", which is essentially a self-documenting list of rows. FIG. 7 shows the data structure 450 of the transported data as stored in the buffer 242 of FIG. 3. Thus the terms "buffer", "portable data structure", and "intermediate data structure" are herein used interchangeably.

As shown in FIG. 7, the data stored in the buffer 242 has a header 452, a table definition section 454, a fixed format row storage section 456, and a variable length format data section 458. The header 452 defines the size of the buffer and the size of each section of the buffer, as well as the number of rows of data stored in the data structure.

The table definition section 454 defines the format of each distinct type of row stored in sections 456 and 457. The first item in this section is a list 459 of all the tables names for which table definitions follow. Each table definition 460 includes a definition for each column, including a list of column names 462, a list of column data types 464, and for those columns which contain derived data, expressions 466 denoting how values in the columns were derived. The latter field 466 is used only when retrieving data from the database. There is also a primary key definition 468 denoting the ordered set of columns of the table which form its primary key.

Usually, when data from a directed graph is being inserted into a database, the columns in each row which is stored in the intermediate format are the same as, or a subset of the columns of the target base table in which the directed graph is being stored. However, an update query can specify an expression defining the value to be stored in particular column as a specified function of one or more fields in the directed graph record being updated.

The fixed format section 456 contains one row 470 for every row of data that is being transported. Each row 470 begins with a "table number", which references one of the table definitions in section 454. The remainder of the row 470 contains all the columns of the row which are fixed length data items, i.e., excluding variable length strings, lists, arrays and so on. Each column in the row 470 which contains variable length data is replaced by a pointer to an item in section 458 of the buffer, at which position is stored the actual data value for that column. Furthermore, for each reference column, the reference value is replaced by a row number indicating which row in the fixed format data section 456 is being referenced.

Note that by replacing variable length data with fixed format pointers, the rows in section 456 are all fixed in length.

The variable format section 458 contains variable length strings and other variable length data. Each such item 480 stored in this section 458 is pointed to by a column entry in one of the rows 470.

Furthermore, when storing data into the buffer format shown in FIG. 7, either while retrieving data from the database or storing a directed graph for transportation to the database, the following technique is used to avoid storing duplicate copies of rows or records. Referring to FIG. 8, for each row stored in the buffer, an entry 492 is made in a hash table 490. That entry 492 contains a unique row or record identifier (e.g., the primary key for rows retrieved from the database, and the address of records obtained from a directed graph), a pointer to the corresponding table definition in the table definition section 454 of the buffer, and a pointer to the row as stored in the fixed format data section 456 of the buffer. It also contains a link field 494 for sequentially accessing all entries in the hash table in the same order that the entries were added to the hash table. Before storing each row or record in the buffer 241 or 242 the application interface or DBMS (depending on which direction data is being transported) checks the hash table 490 to see if there is already an entry 492 in the hash table for that row or record. If so, the row or record has already been stored in buffer 241 or 242 and so the row or record is not stored a second time in the buffer.

Updating a Specified Portion of a Base Table

In the preferred embodiment, using an extended version of the SQL query language, the modification queries include an INSERT statement, an UPDATE statement, and a DELETE statement.

Consider storing the rows in parts Table 400 (shown in FIG. 6) related to the engine and parts within the engine. Using prior art SQL commands requires 43 queries:

```
INSERT INTO  Parts  VALUES  ("ENGINE", 3000.00, "CAM SHAFT", ...)
INSERT INTO  Parts  VALUES  ("CAM SHAFT", 500.00, "", ...)
```

```
-continued
INSERT  INTO  Parts  VALUES  ("WATER JACKET", 500.00, "", ...)
INSERT  INTO  Parts  VALUES  ("CYLINDER 1", 250.00, "PISTON 1", ...)
INSERT  INTO  Parts  VALUES  ("EXHAUST VALVE 1", 47.50, "", ...)
INSERT  INTO  Parts  VALUES  ("INTAKE VALVE 1", 47.50, "", ...)
INSERT  INTO  Parts  VALUES  ("PISTON 1", 150.00, "", ...)
INSERT  INTO  Parts  VALUES  ("SPARK PLUG 1", 5.00, "", ...)
   .      .     .      .       ...
   .      .     .      .       ...
   .      .     .      .       ...
INSERT  INTO  Parts  VALUES  ("CYLINDER 8", 250.00, "PISTON 8", ...)
INSERT  INTO  Parts  VALUES  ("EXHAUST VALVE 8", 47.50, "", ...)
INSERT  INTO  Parts  VALUES  ("INTAKE VALVE 8", 47.50, "", ...)
INSERT  INTO  Parts  VALUES  ("PISTON 8", 150.00, "", ...)
INSERT  INTO  Parts  VALUES  ("SPARK PLUG 8", 5.00, "", ...)
```

Using the schema definition for Table 400 and the INSERT statement provided by the preferred embodiment of the present invention, the forty-three rows of Table 400 that describe the engine and its subparts are inserted using the single query:

INSERT INTO PARTS USING ARG where ARG refers to a directed graph data structure argument, supplied by the application program, that represents the engine and its subparts. In other words, the application program would first construct a directed graph data structure called ARG. Then it would execute the above INSERT query to insert all the engine data into a specified table.

Thus, to insert all the data about the engine and its subparts using this invention requires only the single query, in contrast to the forty-three queries of the prior art.

Syntax for Insert Statement

Examples of query language extensions are specified below using a modified form of "Backus-Naur Form" (BNF), a notation commonly used to describe computer programming languages. Statements are described by giving their syntax in terms of entities and keywords. Entities are represented as a word enclosed in angle brackets ("<" and ">"). Keywords are shown as capitalized words not enclosed in brackets. Bracketed entities are defined using the symbol "::=". Square brackets ("[" and "]") enclose optional portions of the syntax. If a right square bracket is followed by an asterisk ("*"), the entities and keywords within the brackets may occur zero or more times. An asterisk that does not follow a right square bracket is taken literally.

The Query command used in the preferred embodiment for inserting or storing data into the database has the following format, denoted in modified "Backus-Naur Form":

```
<insertStatement>
    ::= INSERT [INTO] <tableName> [( <insertList> )] <insertSpec>
<insertList>
    ::= <columnName> [, <columnName>]*
<insertSpec>
    ::= VALUES <valuesSpec> [, <valuesSpec> ]*
    ::= SELECT [ALL | DISTINCT] <selectList>
        FROM <tableExpression> [ WHERE <searchCondition> ]
    ::= USING ARG [ <valuesSpec> ]
        [ WHERE <searchCondition> ]
<valuesSpec>
    ::= <valueExpression> [, <valueExpression> ]*
<tableExpression>
    ::= <tableReference> [,<tableReference>]*
```

Thus an INSERT statement is used to insert a directed graph, or specified portions of a specified directed graph, into a specified base table in the database. The USING ARG portion of the statement defines what portions of the ARG directed graph data structure are to be inserted into the database. In particular, for each record REC in the ARG directed graph data structure whose corresponding base table is <tableName> and for which <searchCondition> is true (i.e., when applied to REC), the application interface inserts into the columns specified by <insertList> of the base table specified by <tableName> values of the fields in REC given by <valuesSpec>. If the optional <valuesSpec> in the USING ARG clause is omitted, the fields of the inserted records are assumed to correspond to columns of <tableName> having the same names.

Syntax for Update Statement

The UPDATE statement updates data in the columns of pre-existing rows in a specified base table. The Query command used in the preferred embodiment for updating data previously stored in the database has the following format, denoted in modified Backus-Naur form:

```
<updateStatement>
    ::= UPDATE <tableName>
        [ USING ARG [AS <correlationName> ] ]
        <updateSpecification> [, <updateSpecification>]*
        [ WHERE <searchCondition> ]
```

This statement is interpreted as follows: For each record REC in the directed graph data structure whose corresponding base table is <TableName>, locate the row R of table <tableName> whose primary key matches the primary key of REC. If <searchCondition> is true (i.e., when applied to REC and/or R), update row R as specified by the <updateSpecification>s. An example of an <updateSpecification> is "SET A=NEW.A". If the optional <correlationName> is not given, its default value is "NEW". The fields of REC may be referred to in <searchCondition> using <correlationName>.<fieldName>

An example of an UPDATE statement is:

UPDATE T1
USING ARG
SET a = new.a, b = new.x * 100

SYNTAX FOR DELETE STATEMENT

The Query command used in the preferred embodiment for deleting data previously stored in the database has the following format, denoted in modified Backus-Naur form:

```
<deleteStatement>
    ::= DELETE FROM <tableName> <deleteSpec>
<deleteSpec>
    ::= WHERE <searchCondition>
    ::= ALL
    ::= USING ARG [AS <correlationName> ]
        [ WHERE <searchCondition> ]
```

The DELETE statement is interpreted as follows: For each record REC in the ARG directed graph data structure, locate the row R of table <tableName> whose primary key matches the primary key of REC. If <searchCondition> is true (i.e., when applied to row R and to record REC), delete row R from <tableName>. If the optional <correlationName> is not given, its default value is "NEW". Fields of REC may be referred to in <searchCondition> using <correlationName>.<fieldName>

An example of a DELETE statement is:

DELETE FROM T1
USING ARG

CONVERTING A DIRECTED GRAPH INTO INTERMEDIATE FORMAT

The following description includes pseudocode representations of the software routines relevant to the present invention. The pseudocode used herein is, essentially, a computer language using universal computer language conventions. While the pseudocode employed here has been invented solely for the purposes of this description, it is designed to be easily understandable by any computer programmer skilled in the art. The computer programs in the preferred embodiment are written primarily in the MAINSAIL programming language, compilers for which are commercially available from Xidak, Inc. of Palo Alto, California.

Referring to FIGS. 3, 7 and 8, the procedure used by the data translator 236 in the interface 232 to convert a specified directed graph data structure into the intermediate data format shown in FIG. 7, is as follows.

PSEUDOCODE FOR STORING DIRECTED GRAPH IN BUFFER

```
INITIALIZATION:
    CLEAR HASH TABLE      - (see FIG. 8)
    CLEAR LIST RECS FOR STORING RECORDS
    CLEAR LIST OF TABLE DEFINITIONS TDEF
STORE IN TDEF THE TABLE DEFINITIONS FOR ALL DISTINCT TYPES
OF RECORDS THAT ARE TO BE INSERTED INTO THE DATABASE
STORE TOP LEVEL RECORD IN RECS
STORE CORRESPONDING ENTRY IN HASH TABLE
FOR EACH RECORD IN RECS (BEGINNING WITH TOP LEVEL RECORD)
    FOR EACH POINTER IN RECORD
        RR = RECORD POINTED TO BY POINTER
        IF RR IS NOT ALREADY IN HASH TABLE AND
            RR MEETS SPECIFIED <searchCondition>
            ADD RR TO HASH TABLE
            ADD SPECIFIED FIELDS OF RR TO RECS
        ENDIF
    ENDLOOP
    USE LINK IN HASH TABLE TO FIND NEXT RECORD, IF ANY
ENDLOOP
STORE TDEF AND RECS IN BUFFER FORMAT SHOWN IN FIG. 7
```

The initialization step in the above pseudocode routine sets up an empty hash table and two lists: one for records called RECS and one for table definitions called TDEF. Table definitions for all the distinct types of records that are to be inserted into the database are added to the TDEF list.

The list of records in the application interface buffer 242 is constructed by visiting each record in the directed graph data structure once, and recording its associated information in the buffer. More specifically, every record reachable from the specified starting record is processed.

To prevent storing a record more than once, which would be the case when the directed graph contains cycles or multiple pointers to one record, the application interface checks, upon visiting each potentially new record, whether that record is already in the RECS list (by looking for the record in the hash table 490), and if so, it does not process that record any further. If the record has not already been visited, the application interface checks the specified <searchCondition> to determine whether to add this record to the RECS list. If so, the fields of the record specified by <valuesSpec> are stored as a new row in the RECS list. The record is also added to the hash table. Then the buffer building process moves onto the next record found using the link field of the hash table.

When all the records of the directed graph have been visited, the resulting lists TDEF and RECS are stored in the application interface buffer 242 in the format shown in FIG. 7, which was described above.

Next, the list of rows 246 in buffer 242 is transmitted by the application interface 232 to the corresponding application task 212 in the DBMS process 210, along with the command (i.e., INSERT, UPDATE or DELETE) which is transmitted to the DBMS by software module 234 in the application interface.

The list of rows 246, now in buffer 241 of the application task 212 in the DBMS, are then either added to the specified target base table, or used to update pre-existing records in the target base table (if the application's query was an UPDATE or DELETE command). During this process, the Reference pointers stored in the intermediate buffer format as row numbers are replaced with the primary key values of the appropriate rows in the target base table.

When a modification query that contains a USING ARG clause is issued by an application, the application must provide additional declarative information to the application interface to enable it to traverse through the directed graph data structure, and to enable it to associate each type of record in the directed graph data structure with a particular table in the database. This additional information is provided along with both the query and the directed graph data structure (ARG) itself.

For programming languages, such as the C language, that do not represent data structures in a self-descriptive way (at runtime), the additional declarative information must include the following information for each distinct type of record in the directed graph data structure that is to be sent to the DBMS:

1) The name of each field in this record type that is to be passed to the DBMS.
2) The displacement of each such field from the start of the record.
3) The type (e.g., integer, string, decimal, ...) of each such field.
4) If the field is a pointer to a record, the name of the database table corresponding to the pointed-to record.
5) The name of the table in the database to which this record type corresponds.

In addition, the record description that corresponds to the top-level record in the directed graph data structure must be identified so that the application interface knows how to "begin" its traversal of the directed graph.

For programming languages that have self-descriptive data structures, such as the MAINSAIL programming language, the additional declarative information must include the following information for each distinct type of record in the directed graph data structure that is to be sent to the DBMS:

1) An instance of this type of record, referred to as a "model record".
2) The name of the table in the database to which this type of record corresponds.

The model record is used as a template against which records encountered in the traversal of the directed graph data structure can be matched. For each record REC encountered, the application interface compares the REC's type with each of the model record type's until a match is found. It then knows the name of the table in the database that corresponds to REC.

Another feature of the preferred embodiment, which improves efficiency by reducing the number of distinct queries to be processed by the DBMS, is that the protocol between the application interface and the DBMS allows more than one query command to be transmitted as a part of a single query string. More particularly, a single transmitted query string can contain several query commands separated by semicolons (i.e., "query1; query2; ..."). Thus, a multiplicity of INSERT, DELETE and UPDATE statements may be associated with a single directed graph data structure.

Thus, for both self-descriptive and non-descriptive application programming languages, the declarative information passed to the application interface along with the ARG includes a description of each distinct type of record in the directed graph data structure, and the name of the corresponding database table.

RETRIEVING A SPECIFIED PORTION OF A DIRECTED GRAPH

In general, data is retrieved from any database by sending a query to the DBMS 200. The DBMS 200 interprets the query, generates a set of detailed instructions for executing the specified query, and either returns the requested data or an error code that explains why it is unable to comply with the query.

For instance, referring to the table 400 shown in FIG. 6, an example retrieval query using prior art SQL would be:

```
SELECT *
FROM parts
WHERE partName = 'ENGINE'
```

When applied to table 400 in FIG. 6, this query requests the DBMS to retrieve the row of the base table whose partName is "ENGINE". This prior art query retrieves only one row of the table: the row with a partName of "ENGINE". Of course, another prior art query could be used to retrieve all the rows of the table 400 which have a PartName beginning with the string "PISTON", which would result in the retrieval of eight rows: the rows for PISTON 1 through PISTON 8.

More importantly, the prior art query for retrieving the "ENGINE" row does not retrieve any information about the ten parts which are components of the engine, except for their names. Note that this discussion assumes that a prior art version of base table 400 would have the names of the engine's components stored in the "ENGINE" row of table 400 instead of references to the rows of table 400 for those components.

To solve this problem, the present invention modifies the industry standard SQL language to include two new keywords, EXPAND and DEPTH, for controlling the retrieval of directed graph data structures. In the preferred embodiment, whenever a SELECT statement includes the keyword EXPAND (and does not include the keyword DEPTH), the DBMS process will respond to the SELECT query by retrieving two sets of data:

(1) all rows, or specified portions of rows, which meet a specified set of conditions, which are typically denoted by a WHERE or HAVING clause in the SELECT statement; and (2) all rows, or specified portions of rows, which are pointed to by Reference pointers in other rows of data retrieved in response to the query.

It is important to note that the second category of data which is retrieved is a recursive definition. In other words, the DBMS process continues to retrieve data until all rows which are pointed to by any previously retrieved row have been retrieved.

The purpose of the DEPTH <n> clause in the SELECT statement is to limit the amount of data retrieved by a SELECT statement which includes the EXPAND keyword. In particular, whenever a DEPTH <n> clause is used, every row of the specified table which is retrieved must by connected to one of the retrieved top-level row(s) by a chain of n−1 or fewer pointers.

In the preferred embodiment, the extended SQL syntax for query select statements provided by the present invention, denoted in modified "Backus-Naur Form" is:

```
<selectStatement>
        ::= SELECT [DISTINCT | ALL] <selectList> FROM <tableExpression>
            [ ORDER [BY} <sortColumn> [,<sortColumn>]* ]
<selectList>
        ::= <valueExpression> [AS <columnName>] [, <selectList>]*
        ::= <qualifier>.* [, <selectList>]*
        ::= *
<tableExpression>
        ::= <tableReference> [,<tableReference>]*
            [ EXPAND [DEPTH <n>] <expansionSpec> [, <expansionSpec>]* ]
            [ WHERE <searchCondition> ]
            [ GROUP [BY] <columnSpecification>
                [, <columnSpecification>]* ]
            [ HAVING <searchCondition> ]
<tableReference>
        ::= <tableName> [AS <correlationName>]
<expansionSpec>
        ::= <tableName> [ ( <expandColumnList>]
                [ WHERE <expansionPredicate>] ) ]
        ::= *
<expandoColumnList>]
        ::= <columnName> [ AS <columnName>]
                [, <columnName> [ AS <columnName>]]*
        ::= *
<expansionPredicate>
        ::= <searchCondition>
<sortColumn>
        ::= [−] <columnSpecification>
```

It should be noted that all aspects of the above definition are the same as prior art SQL, except for the EXPAND, DEPTH and <expansionSpec> terms. An <expansionSpec> tells how to expand columns that are REFERENCEs to a specific table. In other words, it specifies which table and which reference columns in that table are to be used for expansion. The <expansionSpec> clause can also specify logical conditions which limit the rows that are retrieved during expansion.

Consider the effect of adding an EXPAND clause to the query discussed above for selecting the "ENGINE" row of the parts base table:

```
SELECT *
FROM parts
```

```
EXPAND parts(*)
WHERE partName = 'ENGINE'
```

Note that the "parts" table is the table 400 shown in FIG. 6. Like the prior art query, this query commands the retrieval of the row in table 400 for "ENGINE". Call this row the top-level row. The EXPAND clause

```
"EXPAND parts(*)"
``` directs that whenever a REFERENCE to the table called parts is encountered in any retrieved row, the reference is to be followed according to the expansion process described above. Thus, referring to FIG. 6, not only is the row for "ENGINE" retrieved, but also the ten rows with partName's of CAM SHAFT, CYLINDER 1, CYLINDER 2, CYLINDER 3, CYLINDER 4, CYLINDER 5, CYLINDER 6, CYLINDER 7, CYLINDER 8, and WATER JACKET.

In addition, since these rows also have a containsParts column with references to other rows in the table Parts, the expansion process continues with these rows, and so on. Specifically, each of the eight cylinders rows have references to an exhaust value, an intake valve, a piston, and a spark plug. Together, the rows for the eight cylinders reference thirty-two more part rows that are also retrieved, namely the rows for the parts:

| EXHAUST VALVE 1 | INTAKE VALVE 1 | PISTON 1 | SPARK PLUG 1 |
| EXHAUST VALVE 2 | INTAKE VALVE 2 | PISTON 2 | SPARK PLUG 2 |
| ... | | | |
| EXHAUST VALVE 8 | INTAKE VALVE 8 | PISTON 8 | SPARK PLUG 8 |

Thus, the above query with the EXPAND specification causes the top-level row and forty-two additional rows reached through the top-level row to be retrieved, or forty-three retrieved rows in total. The additional forty-two rows retrieved by this query are structurally related to the top-level row through a path of references from the top-level row ("ENGINE") to each of the other rows retrieved.

Without the optional EXPAND clause, data stored in the columns specified in the <selectList> of a SELECT command are copied into a "top-level" record in the application program. Retrieved data from columns with a data type of REFERENCE is stored in a field or fields of the application's "top-level" record(s) that contain the foreign key values associated with the reference.

The optional EXPAND clause in a SELECT statement causes the specified REFERENCE columns to be expanded. A column of type REFERENCE is said to be expanded if it is retrieved into the application program as a pointer to another record, rather than as the foreign key values associated with the reference. The columns of the expanded row themselves become candidates for further expansion.

Only those columns that are of type REFERENCE are expanded. If the <expandColumnList> in the EXPAND clause is "*", then all columns of the table specified by the EXPAND clause are expanded If the <expansionSpec> in the EXPAND clause is "*", then all columns of all tables not mentioned in an expansion clause are expanded in their entirety, limited only by the DEPTH specified, if any.

Specifically, consider a column "c" whose type is REFERENCE and that refers to a particular row "r" in table "t". Column "c" will be expanded if all of the following conditions are met:
  (i) an EXPAND clause is present and the EXPAND clause specifies that references to table "t" are to be expanded;
  (ii) the "WHERE" condition associated with the particular <expansionSpec> used is TRUE for row "r", or there is no such "WHERE" condition; and
  (iii) the number of previously expanded rows required to reach row "r" does not exceed the "DEPTH" number given in the "EXPAND" clause, or there is no DEPTH limit.

The columns of the row "r" that are retrieved and that become possibly candidates for expansion themselves are limited to the columns that appear in the <expandColumnList> following <tableName> "t" in the expansion clause. If the <expandColumnList> associated with table "t" is "*", then all columns of table "t" are retrieved and are candidates for expansion. Similarly, if the <expansionSpec> "*" appears, and <tableName> "t" does not occur in the EXPAND clause, then all columns of table "t" are retrieved and become candidates for expansion.

The candidate columns for expansion initially come from the columns whose names appear in <selectList> of the SELECT command. Once a column "c" that refers to row "r" is expanded, any columns of "r" that meet conditions (i), (ii), and (iii) above are expanded and become candidates for expansion themselves, at the next higher depth level.

The optional DEPTH clause limits the expansion to <n> levels. Specifying a depth of one (1) limits the retrieved data structure to one or more "top-level" records, which directly meet the criteria of the "WHERE" clause in the SELECT statement, with no other records below the top-level. A depth of three limits the expansion to three levels, including the top-level row and up to two levels below it. Note that the retrieved records, regardless of the specified DEPTH, will contain only those fields which correspond to the columns in <selectList> of the SELECT statement.

In the preferred embodiment, the depth number applies specifically to a "breadth first" expansion process. Thus, the retrieved directed graph data structure may, in general, contain cycles and/or multiple pointers to the same substructure, and thus there may be paths from the top-level record of the structure to other records in the structure that exceed the specified depth. In other words, if the specified DEPTH is equal to a positive integer n, and if the minimum number of references required to get from a top-level row to a particular second row is less than n, then that second row is retrieved even if there are other paths between the top-level row and the second row which traverse n or more reference pointers.

During a reference expansion, if a reference is incomplete (contains at least one NULL key value) or references a non-existent row, the reference is returned to the application as a NULL pointer. Similarly, if the DEPTH is exceeded, the reference is returned as a NULL pointer.

The data structures that may be retrieved as a result of a SELECT with an EXPAND clause include n-ary trees (n=0, 1, 2,...), linked lists, and, in general, any directed graph data structure. If the data in the database refer to the same row more than once, only a single instance of the row is retrieved Thus, only a single copy of each unique database row will be retrieved and stored as a record in the directed graph data structure that is selected.

Referring to FIGS. 3, 7 and 8, the procedure used by the DMBS to perform an expanded SELECT query and to store the retrieved data in the intermediate data format shown in FIG. 7, denoted in pseudocode form, is as follows.

PSEUDOCODE FOR RETRIEVAL WITH TRANSITIVE CLOSURE

```
INITIALIZATION:
    CLEAR HASH TABLE
    CLEAR LIST RROWS FOR STORING RETRIEVED ROWS
    CLEAR LIST OF TABLE DEFINITIONS TDEF
RETRIEVE TOP LEVEL ROWS IN ACCORDANCE WITH UNEXPANDED
SELECT STATEMENT
STORE TABLE DEFINITION FOR TOP LEVEL ROWS IN TDEF
STORED TOP LEVEL ROW(S) IN RROWS
STORE CORRESPONDING ENTRY OR ENTRIES IN HASH TABLE
FOR EACH ROW IN RROWS (BEGINNING WITH TOP LEVEL ROW)
    FOR EACH REFERENCE (IN ROW) MENTIONED IN EXPAND CLAUSE
        RR = RECORD POINTED TO BY REFERENCE
        IF RR IS NOT ALREADY IN HASH TABLE
        AND
```

```
        RR MEETS SPECIFIED WHERE <searchCondition> AND
        AND
        DEPTH OF RR FROM TOP LEVEL ROWS DOES NOT
        EXCEED DEPTH LIMIT
            ADD SPECIFIED COLUMNS OF RR, INCLUDING
            CALCULATED VALUES, TO RROWS
            IF TABLE DEFINITION FOR RR IS NOT ALREADY IN
            TDEF
                ADD TABLE DEFINITION FOR RR TO TDEF
            ENDIF
            ADD RR TO HAS TABLE
        ENDIF
    ENDLOOP
    USE LINK IN HASH TABLE TO FIND NEXT ROW, IF ANY
ENDLOOP
STORE TDEF AND RROWS IN BUFFER FORMAT SHOWN IN FIG. 7
TRANSMIT DATA IN BUFFER FORMAT TO APPLICATION INTERFACE
```

The initialization step in the above pseudocode routine sets up an empty hash table and two lists: one for retrieved rows called RROWS and one for table definitions called TDEF. Table definitions for all the distinct types of rows that are retrieved (i.e., from distinct base tables) are added to the TDEF list as the list of retrieved rows is accumulated.

The list of rows in the DBMS application task buffer 241 is constructed by visiting each retrieved row in the RROWS list once, and expanding those reference columns denoted in the EXPAND clause. Notice that each expansion of a row may add new rows to the end of RROWS. When the last row of RROWS is expanded, the transitive closure has been computed. The expansion process must eventually reach the end of RROWS because duplicate rows are not added to the RROWS list, and there are a finite number of rows in any database.

To prevent storing a record more than once, which would be the case when the directed graph contains cycles or multiple pointers to one base table row, the DBMS checks, upon visiting each potentially new row, whether that row is already in the RROWS list (by looking for the row in the hash table 490), and if so, it does not process that row any further. If the row has not already been visited, the DBMS checks the specified <expansionPredicate> (which is a type of search condition) to determine whether to add this row to the RROWS list. If so, the columns of the row specified by <selectList> are stored as a new row in the RROWS list. The row is also added to the hash table. Then the buffer building process moves onto the next row in the RROWS list, which is found using the link field of the hash table.

When all the rows in RROWS have been visited, the resulting lists TDEF and RROWS are stored in a buffer 241 by the DBMS in the format shown in FIG. 7. This retrieved data is logically equivalent to one or more derived tables. A derived table is a subset or portion of a base table from which data is being retrieved. The retrieved, buffered data is transmitted to the application interface 232, which then converts the retrieved list of rows into a directed graph data structure suitable for use by the application program which generated the retrieval query.

Referring to FIG. 7, the procedure for converting the retrieved data (stored in buffer 242 in the intermediate data format shown in FIG. 7) into a directed graph data structure, denoted in pseudocode form, is as follows.

PSEUDOCODE FOR CONVERTING RETRIEVED DATA INTO DIRECTED GRAPH

```
READ RETRIEVED DATA IN APPLICATION INTERFACE BUFFER
ALLOCATE AN ARRAY OF POINTERS REFROWS TO STORE POINTERS TO
EACH OF THE ROWS IN THE BUFFER
FOR EACH ROW R IN THE BUFFER
    ALLOCATE A RECORD THAT CONTAINS FIELDS FOR EACH OF THE
    RETRIEVED COLUMNS OF DATA, AS WELL AS ANY ADDITIONAL
    FIELDS SPECIFIED BY THE APPLICATION PROGRAM
    (RETRIEVED DATA IS INTERPRETED USING THE CORRESPONDING
    TABLE DEFINITION IN THE BUFFER)
    STORE POINTER TO ALLOCATED RECORD IN CORRESPONDING
    POSITION OF REFROWS
ENDLOOP
FOR EACH ROW R IN THE BUFFER
    STORE DATA FOR THE ROW R FROM THE BUFFER INTO THE
    ALLOCATED RECORD
    FOR EACH FIELD IN THE ALLOCATED RECORD WHICH
    CORRESPONDS TO AN EXPANSION COLUMN
        REPLACE ROW NUMBER (N) WITH POINTER IN REFROWS (N)
    ENDLOOP
ENDLOOP
ARG = FIRST POINTER IN REFROWS -   Pointer to Top Level
                                   Record of Directed Graph
DEALLOCATE REFROWS ARRAY
PASS ARG TO APPLICATION PROGRAM
```

When a SELECT query with an EXPAND clause is specified, the application interface uses the declarative information about the tables involved, stored within the table definition portion of the buffer that it receives from the DBMS, to transform the "flat" buffer representation into a directed graph data structure in the application programming language's representation.

Each application programming language has its own data structure representation mechanisms and its own data types. Thus, the representation of retrieved directed graph data structures differs somewhat from one computer programming language to another.

In the preferred embodiment, when a SELECT query with an EXPAND clause is issued, the application interface accepts from the application program some optional record descriptions, in conjunction with the query itself, that enables the application program to specify the exact memory layout to use for each table whose rows are being retrieved as part of the directed graph data structure.

The form in which record descriptions are provided is similar to the way records are described when a USING ARG query is issued, as described above. During the translation of retrieved data (stored in the intermediate buffer format) into a directed graph data structure, the application interface uses the record descriptions for each type of record being retrieved to decide how to allocate the record and where to store each field.

Allowing the application to provide this optional information has two significant advantages. First, it ensures that a record template can be declared in the application programming language to match the records constructed by the interface. Thus convenient language constructs can be used to access records. Second, it allows the application program to include in each record some additional fields that do not correspond to retrieved data, but that the program may need to perform certain operations on the records. An example of an additional field is a flag field that the application program can set during its own processing to mark that a particular record should be modified or deleted in the database. This field may then be referred to in the <searchCondition> associated with a later DELETE ... USING ARG query, for example.

In summary, the directed graph data structure is generated by storing each row in the buffer in the form of a record in the format expected by the application program. Furthermore, expanded references which are represented in the intermediate buffer format as row numbers are replaced with pointers to the corresponding records in the converted data structure. The resulting data structure is then passed by the application interface 232 to the application program 230.

CONCLUSIONS AND ALTERNATE EMBODIMENTS

It should be noted that the processing of each query by a DBMS requires a certain amount of system resources to process the query, regardless of how simple or complex the query command may be. Thus it takes considerably less system resources for a DBMS to process a single extended query than it takes to process numerous prior art queries, even though the single query retrieves the same amount of data as the numerous prior art queries.

In various uses of the present invention, the number of prior art queries replaced by single extended query will depend on the complexity of the data structures being used and the amount of data that needs to be retrieved. In some contexts, a single extended query may replace hundreds of prior art queries. In addition, the application interface feature of the present invention automatically converts directed graph data structures into table form, and vice versa, thereby reducing the complexity of engineering application programs which use a DBMS to store directed graph data structures.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer system for storing, retrieving and modifying data stored in a database, comprising:
   a database server; and
   a multiplicity of application processes coupled to said database server, each application process including:
      an application program that utilizes directed graph data structures in a corresponding application specific data format; each said directed graph data structure including one or more records of data interconnected by pointers, each record composed of one or more data elements having respective specified data types;
      an application interface that translates directed graph data structures in said application specific data format into a predefined intermediate data format and translates directed graph data structures in said predefined intermediate data a format into said application specific data format; and
      query generating means for generating and sending queries to said database server for storing, retrieving and updating specified directed graph data structures in said database;
   said database server including:
      schema defining means for defining a distinct schema for each of a plurality of tables in said database, each said database table having a plurality of rows and a specified number of columns, wherein each row of said table stores data values in each of said columns of said table; said schema denoting a data type for each column of data values stored in said table, each denoted data type being selected from a set of predefined data types including a reference data type;
      each non-empty data value stored in a reference data type column comprising a reference to a row of one of said tables in said database; and
      directed graph storage means for storing and retrieving specified directed graph data structures in and from specified tables in said database in accordance with queries received from said application processes;
   said directed graph storage means including:
      graph storing means for receiving a data storage query that includes a specified directed graph data structure in said predefined intermediate data format and for storing each record of said received directed graph data structure in a distinct row of a respective one of said tables in said database, said graph storing means including means for storing said data elements of said each record in corresponding columns of said one respective table and means for storing references, each reference corresponding to one of said pointers that interconnect said each record to other records of said specified directed graph data structure, in corresponding ones of said reference data type columns of said one respective table; and directed graph retrieving means for retrieving a specified directed graph data structure from said database in accordance with a single specified query received from one of said application processes, including means for retrieving in accordance with said specified query at least one specified row from at least one respective table in said database and then retrieving additional rows of data from respective tables in said database, said additional rows of data comprising rows of data that are referenced by references in other rows of data retrieved in accordance with said specified query, for converting said retrieved rows of data into a directed graph data structure in said predefined intermediate data format, and for transmitting said retrieved directed graph data structure to said one application process;

whereby a directed graph data structure having multiple records is retrieved by said database server in response to a single query from said one application process.

2. A computer system as in claim 1, said schema defining means denoting in each said schema a table identifier for each reference data type column, said table identifier specifying which database table is referenced by references in that column;

each said table in said database having an associated primary key comprising an ordered list of columns of said table whose values identify a particular row of said table; and each of said references comprising a primary key value of a row in the respective database table specified by the schema for the table in which each said reference is stored.

3. A computer system as in claim 1, wherein each directed graph data structure in said intermediate data format includes rows of data values, each row of data values corresponding to a respective record of a corresponding directed graph data structure in one said application specific data format, said rows of data values including row pointers interconnecting said rows of data values, each row pointer corresponding to a respective pointer in said corresponding directed graph data structure in one said application specific data format.

4. A computer system as in claim 1, said query generating means including means for including in said generated queries specified criteria for limiting retrieval of said additional rows of data.

5. A computer system as in claim 1, said query generating means including means for including retrieval limiting criteria in ones of said generated queries, said retrieval limiting criteria denoting a maximum depth, said maximum depth comprising a maximum number of pointers used in sequence to interconnect one or more top-level records of said specified directed graph data structure with other records of said specified directed graph data structure; and said directed graph retrieving means including means for limiting retrieval of said additional rows of data, when retrieving a specified directed graph data structure in accordance with a query including retrieval limiting criteria, to those of said additional rows of data that are connected to said specified at least one row of data by a sequence of references no greater in number than said maximum number denoted by said retrieval limiting criteria.

6. A computer system for storing, retrieving and modifying data stored in a database, comprising:

a database server;

a multiplicity of application processes coupled to said database server, each application process including:

an application program that utilizes directed graph data structures in a corresponding application specific data format; each said directed graph data structure including one or more records of data interconnected by pointers, each record composed of one or more data elements having respective specified data types;

query generating means for sending queries to said database server for storing, retrieving said updating specified directed graph structures in said database; and at least one application interface that translates directed graph data structures in one respective application specific data format into a predefined intermediate data format and translates directed graph data structures in said predefined intermediate data format into said one respective application specific data format; said at least one application interface coupling said database server to a respective at least one of said application processes;

said database server including:

schema defining means for defining a distinct schema for each of a plurality of tables in said database, each said database table having a plurality of rows and a specified number of columns, wherein each row of said table stores data values in each of said columns of said table; said schema denoting a data type for each column of data values stored in said table, each denoted data type being selected from a set of predefined data types including a reference data type;

each non-empty data value stored in a reference data type column comprising a reference to a row of one of said tables in said database; and directed graph storage means for storing and retrieving specified directed graph data structures in and from specified tables in said database in accordance with queries received from said application processes;

said directed graph storage means including:

graph storing means for receiving a data storage query that includes a specified directed graph data structure in said predefined intermediate data format and for storing each record of said received directed graph data structure in a distinct row of a respective one of said tables in said database, said graph storing means including means for storing said data elements of said each record in corresponding columns of said one respective table and means for storing references, each reference corresponding to one of said pointers that interconnect said each record to other records of said specified directed graph data structure, in corresponding ones of said reference data type columns of said one respective table; and directed graph retrieving means for retrieving a specified directed graph from said database in accordance with a single specified query received from one of said application processes, including means for retrieving in accordance with said specified query at least one specified row from at least one respective table in said database and then retrieving additional rows of data from respective tables in said database, said additional rows of data comprising rows of data that are referenced by references in other rows of data retrieved in accordance with said specified query, for converting said retrieved rows of data into a directed graph data structure in said predefined intermediate data a format, and for transmitting said retrieved directed graph data structure to said one application process;

whereby a directed graph having multiple records is retrieved by said database server in response to a signal query from said one application process.

7. A computer system as in claim 6, said schema defining means denoting in each said schema a table identifier for each reference data type column, said table identifier specifying which database table is referenced by references in that column;

each said table in said database having an associated primary key comprising an ordered list of columns of said table whose values identify a particular row of said table; and each of said references comprising a primary key value of a row in the respective database table specified by the schema for the table in which each said reference is stored.

8. A computer system as in claim 6, wherein each directed graph data structure in said intermediate data format includes rows of data values, each row of data values corresponding to a respective record of a corresponding directed graph data structure in one said application specific data format, said rows of data values including row pointers interconnecting said rows of data values, each row pointer corresponding to a respective pointer in said corresponding directed graph data structure in one said application specific data format.

9. A computer system as in claim 6, said query generating means including means for including in said generated queries specified criteria for limiting retrieval of said additional rows of data.

10. A computer system as in claim 6, said query generating means including means for including retrieval limiting criteria in ones of said generated queries, said retrieval limiting criteria denoting a maximum depth, said maximum depth comprising a maximum number of pointers used in sequence to interconnect one or more top-level records of said specified directed graph data structure with other records of said specified directed graph data structure; and said directed graph retrieving means including means for limiting retrieval of said additional rows of data, when retrieving a specified directed graph data structure in accordance with a query including retrieval limiting criteria, to those of said additional rows of data that are connected to said specified at least one row of data by a sequence of references no greater in number than said maximum number denoted by said retrieval limiting criteria.

11. In a computer system, a control process of storing and retrieving directed graph data structures in a data table in a computer system; said computer system having a multiplicity of application processes coupled to a database server that responds to queries from said application processes by storing, retrieving and updating data in said database; the steps of the control process comprising:

in each application process, executing an application program that utilizes directed graph data structures in a corresponding application specified data format; each said directed graph data structure including one or more records of data interconnected by pointers, each record composed of one or more data elements having respective specified data types;

each application process generating and sending queries to said database reserver for storing, retrieving and updating specified directed graph structures in said database;

when transmitting directed graph data structures from any one of said application processes to said database server, translating said transmitted directed graph data structures from the application specific data format utilized by said one of said application processes into a predefined intermediate data format, when transmitting directed graph data structures from said database server to any one of said application processes, translating said transmitted directed graph data structures from said predefined intermediate data format into the application specific data format utilized by said one of said application processes;

in said database server, defining a distinct schema for each of a plurality of tables in said database, each said database table having a plurality of rows and a specified number of columns, wherein each row of said database table stores data values in each of said columns of said database table; said schema denoting a data type for each column of data values stored in said database table, each denoted data type being selected from a set of predefined data types including a reference data type; type;

each non-empty data value stored in a reference data type column comprising a reference to a row of one of said tables in said database;

in said database server, storing and retrieving specified directed graph data structures in and from specified tables in said database in accordance with queries received from one of said application processes; said storing and retrieving steps including:

receiving from one of said application processes a data storage query that includes a specified directed graph data structure in said predefined intermediate data format, and storing each record of said received directed graph data structure in a distinct row of a respective one of said database tables, said record storing step including storing said data elements of said each record in corresponding columns of said one respective database table and storing references, each reference corresponding to one of said pointers that interconnect said each record to other records of said specified directed graph data structure, in corresponding ones of said reference data type columns of said one respective database table; and retrieving a specified directed graph data structure from said database in accordance with a single specified query received from one of said application processes, including retrieving in accordance with said specified query at least one specified row from at least one respective database table and then retrieving additional rows of data from respective ones of said database tables, said additional rows of data comprising rows of data that are referenced by references in other rows of data retrieved in accordance with said specified query, converting said retrieved rows of data into a directed graph data structure in said predefined intermediate data format, and transmitting said retrieved directed graph data structure to said one application process.

12. The control process of claim 11, said schema defining step including denoting in each said schema a table identifier for each reference data type column, said table identifier specifying which database table is referenced by references in that column;

each said table in said database having an associated primary key comprising an ordered list of columns of said table whose values identify a particular row of said table; and each of said references comprising a primary key value of a row in the respective database table specified by the schema for the table in which each said reference is stored.

13. The control process of claim 11, wherein each directed graph data structure in said intermediate data format includes rows of data values, each row of data values corresponding to a respective record of a corresponding directed graph data structure in the application specific data format utilized by one of said application processes, said rows of data values including row pointers interconnecting said rows of data values, each row pointer corresponding to a respective pointer in said corresponding directed graph data structure in said application specific data format.

14. The control process of claim 11, said query generating step including the step of including in ones of said generated queries specified criteria for limiting retrieval of said additional rows of data.

15. The control process of claim 11, said query generating means including means for including retrieval limiting criteria in ones of said generated queries, said retrieval limiting criteria denoting a maximum depth, said maximum depth comprising a maximum number of pointers used in sequence to interconnect one or more top-level records of said specified directed graph data structure with other records of said specified directed graph data structure; and said step of retrieving a specified directed graph data structure including limiting retrieval of said additional rows of data, when retrieving a specified directed graph data structure in accordance with a query including retrieval limiting criteria, to those of said additional rows of data that are connected to said specified at least one row of data by a sequence of references no greater in number than said maximum number denoted by said retrieval limiting criteria.

* * * * *